United States Patent [19]

Hobhouse

[11] Patent Number: 4,722,175
[45] Date of Patent: Feb. 2, 1988

[54] MACHINE FOR GATHERING FRUIT OR THE LIKE

[75] Inventor: Henry Hobhouse, Castle Cary, United Kingdom

[73] Assignee: Somerset Fruit Machinery Limited, Somerset, United Kingdom

[21] Appl. No.: 851,549

[22] Filed: Apr. 14, 1986

[30] Foreign Application Priority Data

Apr. 18, 1985 [GB] United Kingdom ............... 8509965
Nov. 2, 1985 [GB] United Kingdom ............... 8527036
Jan. 27, 1986 [GB] United Kingdom ............... 8601888

[51] Int. Cl.⁴ ...................... A01D 51/00; A01D 46/00
[52] U.S. Cl. ........................... 56/328.1; 56/DIG. 12; 56/327.1
[58] Field of Search .......... 56/327 R, 328 R, DIG. 12

[56] References Cited

U.S. PATENT DOCUMENTS

| | | | |
|---|---|---|---|
| 2,928,225 | 3/1960 | Spencer | 56/328 R |
| 3,292,806 | 12/1966 | Maab | 56/328 R |
| 3,353,342 | 11/1967 | Hill et al. | 56/328 R |
| 3,390,768 | 7/1968 | Buhon | 56/327 R |
| 3,420,312 | 1/1969 | Greedy | 56/327 R |
| 3,518,819 | 7/1970 | Schneider et al. | 56/328 R |
| 3,678,677 | 7/1972 | Miller et al. | 56/327 R |
| 3,800,518 | 4/1974 | Baggiolini | 56/327 R |
| 3,928,534 | 8/1974 | McRobert | 56/328 R |
| 3,993,141 | 11/1976 | Donohue | 56/328 R |
| 4,014,390 | 3/1977 | Teixeira | 56/328 R |
| 4,077,533 | 3/1978 | Meyer | 56/328 R |
| 4,188,772 | 2/1980 | Jordan et al. | 56/DIG. 15 |
| 4,234,045 | 11/1980 | Porter | 56/327 R |
| 4,434,011 | 2/1984 | Moore | 56/328 R |
| 4,593,426 | 7/1986 | Chrisley | 56/328 R |
| 4,642,977 | 2/1987 | Ramacher | 56/328 R |

Primary Examiner—Paul J. Hirsch
Attorney, Agent, or Firm—Larson and Taylor

[57] ABSTRACT

A machine for gathering articles, such as fruit, from the ground without damaging them, by picking up the articles as the machine moves over the ground, has a forward belt and a rearward belt, journalled to a chassis about horizontal rollers that are transverse to the direction of travel X. The rearward belt has a taut upper run which lies face-to-face with a slack lower run of the forward belt, to form a nip. A loop of the forward belt rests loosely on the ground. This gently pins the articles to the ground before they are drawn into the nip. The articles are then discharged rearwardly from the top of the belts and are collected in a container. The belts move at the same speed relative to each other, and move at a speed which is non-positive relative to the ground speed of the machine so that the loop is stationary relative to the ground, or moves rearwardly to draw the articles towards the nip.

7 Claims, 10 Drawing Figures

MACHINE FOR GATHERING FRUIT OR THE LIKE

This invention relates to machinery for gathering articles such as fruit or the like from a surface; and is especially applicable to gathering fallen apples.

Conventional fruit gathering machinery is very expensive, inefficient or unduly rough in handling the fruit. For example, U.S. Pat. No. 2,664,691 shows a machine for picking up prunes, in which a belt is provided with spikes for impaling the prunes. GB Patent No. 2034607 shows a device in which a rapidly rotating paddle wheel picks up the fruit and flings it rearwards onto a conveyor belt. In both cases the fruit is roughly handled. Some machines use counter-moving forward and rearward belts to entrain the fruit. U.S. Pat. No. 2,993,322 shows face-to-face inclined contra-rotating belts for picking up fruit. However, the forward belt is trained around rollers and tensioned; the lower roller of the forward belt has to be arranged to be above the ground at a height approximately the diameter of the fruit to be collected; and the forward pick-up belt has to be adjusted for tautness and its position adjusted so that it is in selected spaced relation to the rear pick-up belt to suit the fruit. FR Patent No. 1028605 shows a somewhat similar device, but again the upper belt is relatively tightly entrained around end reversing rollers, the lower roller has to be raised and lowered relative to the ground, and the upper belt as a whole has to be adjusted to the correct distance from the lower belt. DE Patent No. 3102082 is essentially similar. In FR Patent No. 2067099 the lower end of the forward belt is about the same level as the lower end of the rearward belt, but both are above the ground, and have resilient fingers for picking up the fruit. In FR Pat. No. 2449395 the forward belt chassis can be hinged about the axis of the upper roller so that its lower end is upwardly displaceable to allow for the size of the beetroots; however the belt is still relatively tightly entrained around the rollers.

The present invention provides a new approach to the problem, and in particular can provide relatively inexpensive and highly efficient machinery, which handles for example apples sufficiently gently that they can be used for juicing.

According to the present invention there is provided a machine for gathering articles from a surface, comprising a chassis arranged for forward travel over the surface, article pick-up means comprising forward and rearward members at ground level each comprising a belt or roller journalled to the chassis about horizontal axes transverse to the direction of travel and arranged to provide a nip in which the articles can be entrained, and means for driving the pick-up members in counter-movement as the machine moves over the surface, the forward member having a flexible and deformable peripheral region resting on the surface in front of the rearward member, the drive to the members being linked to the forward travel of the machine over the surface so that the surface-engaging portion of the forward member moves at a substantially non-positive speed (in the forward direction) relative to the surface.

Thus the surface-engaging portion of the forward member may be stationary relative to the surface, which is achieved by driving the forward member at a speed equal to the forward speed of the machine over the surface. Alternatively, the surface-engaging portion may move in the rearward direction relative to the surface. This is achieved by driving the forward member at a speed greater (e.g. 10% greater) than the speed of the machine over the surface.

Further features of the invention will be apparent from the following description of various embodiments with reference to the accompanying drawings, which are for the most part diagrammatic, wherein.

Figure 4:
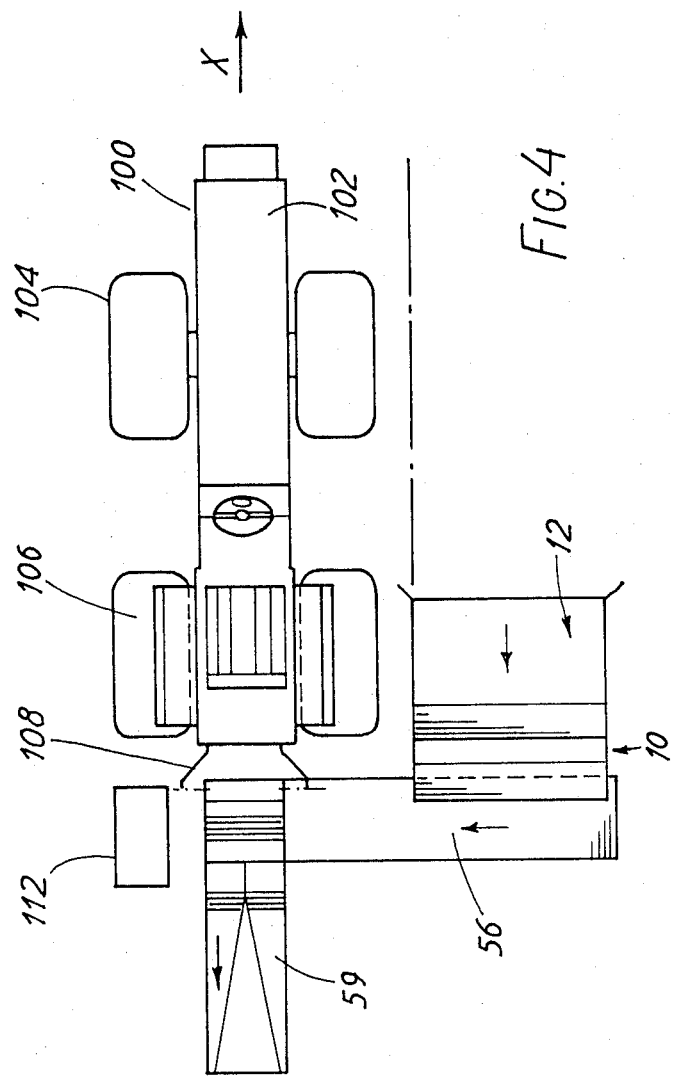

FIG. 4 a plan view, and

Figure 1:
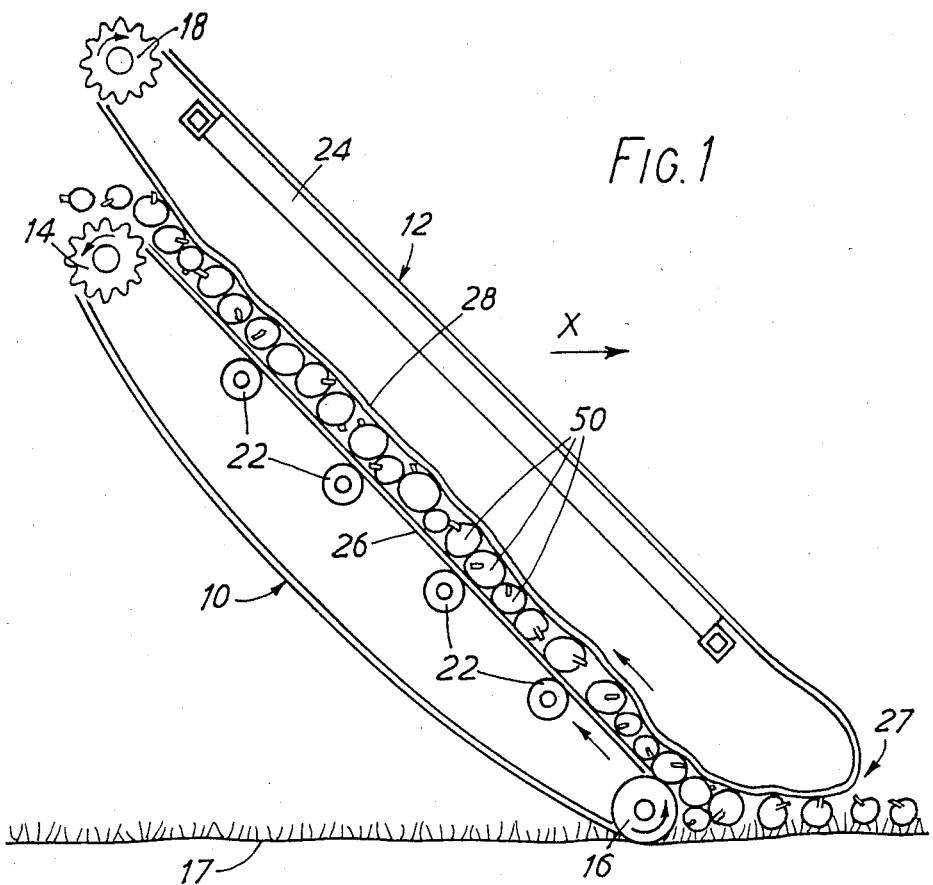
FIG. 1 shows a side view of the principal working components which characterise one form of the present invention.
Figure 5:
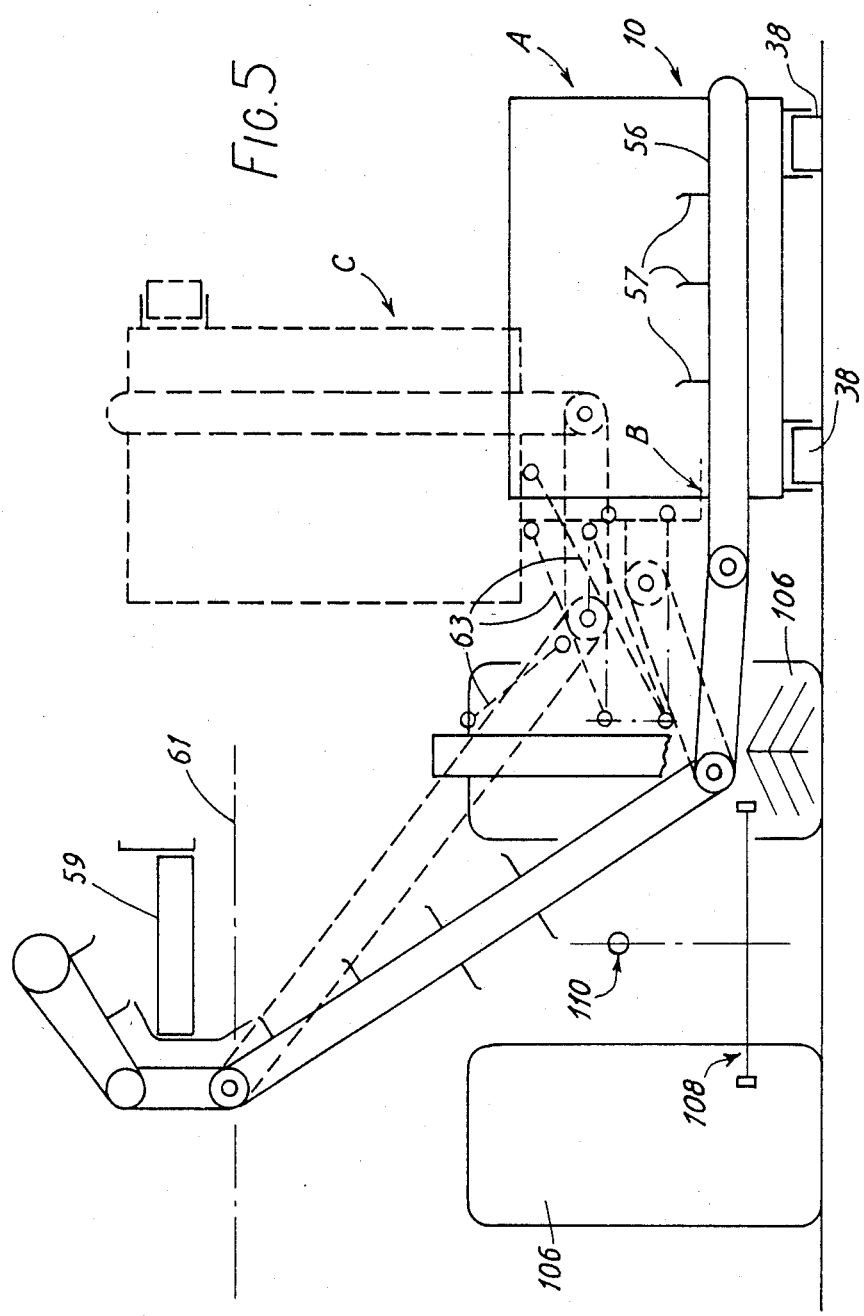
Figure 6:
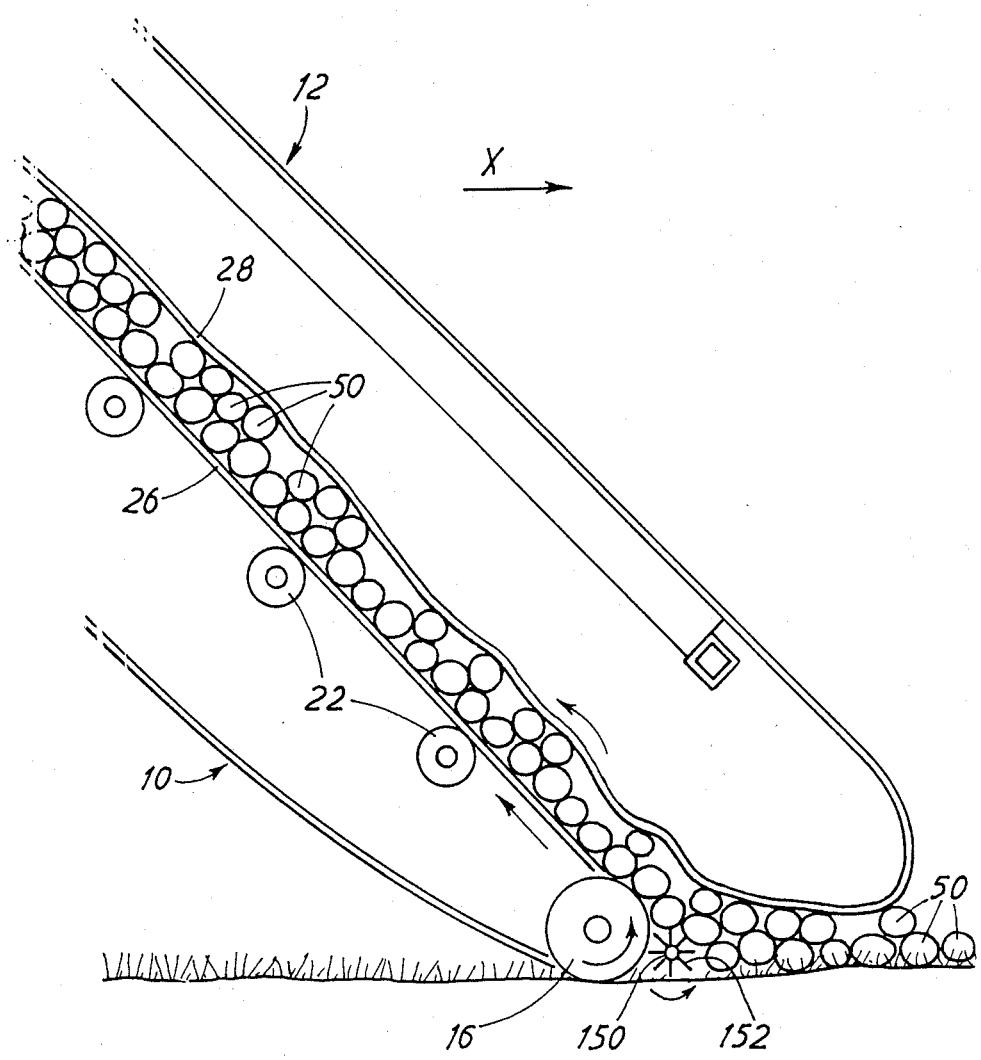
Figure 7:
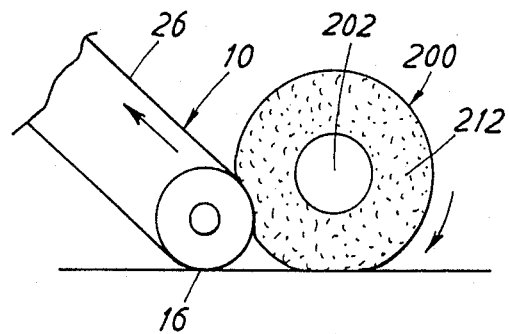
Figure 8:
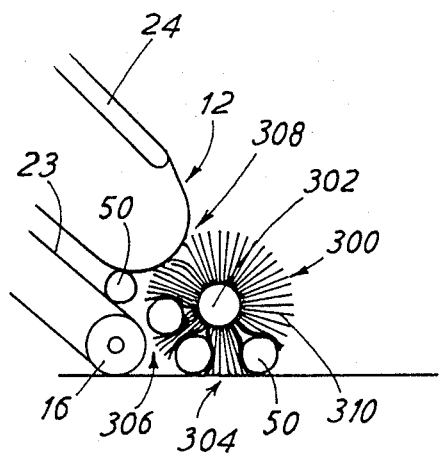
Figure 9:
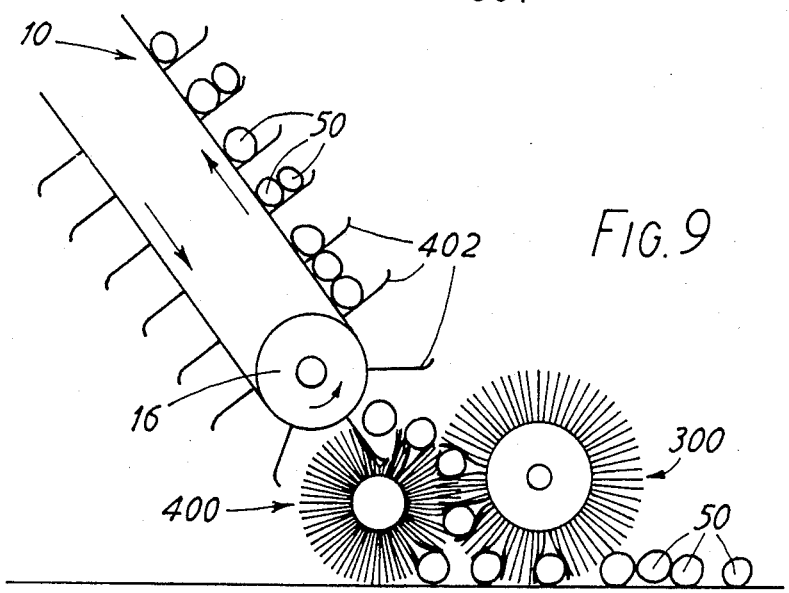
Figure 10:
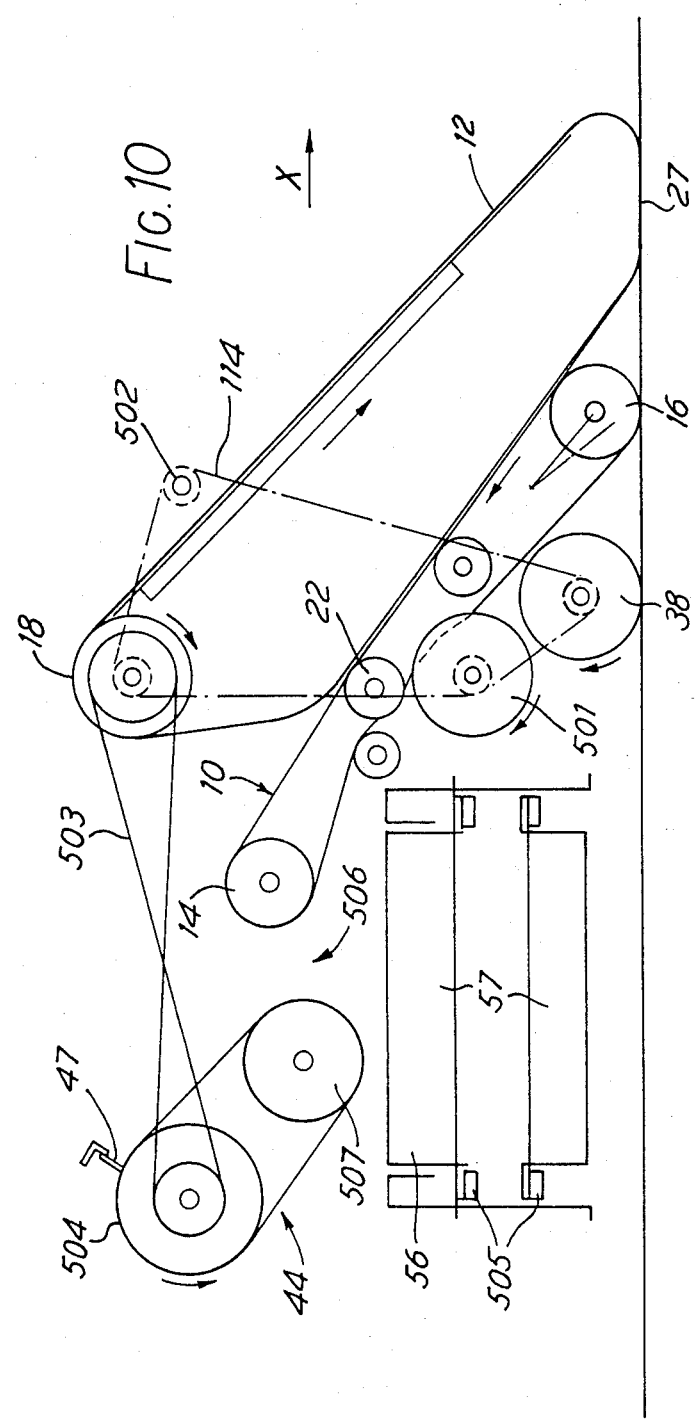

FIG. 5 a rear end view of a tractor-mounted embodiment of the apparatus;

FIG. 6 shows diagrammatically a side view of a modification of the apparatus of FIG. 1 for gathering small articles such as nuts;

FIG. 7 shows diagrammatically a side view of part of one embodiment of device incorporating a sponge roller forward pick-up member;

FIG. 8 shows a side view of the forward end of an embodiment incorporating a brush roller forward pick-up member;

FIG. 9 shows a side view of the forward end of a doubleroller pick-up means; and FIG. 10 shows a side view of another embodiment of the invention.

Referring to the drawings and firstly to FIG. 1; the principal working elements of this form of the invention comprise a pair of endless belts 10,12 trained around rollers 14,16, 18, assisted and supported by guide rollers 22 and guide bars 24 where appropriate. The rearward belt 10 has an upper run 26 which extends from a lower end reversing roller 16 adjacent the ground 17 to an upper end reversing roller 14 in a rearward inclination with respect to the direction of travel of the apparatus (indicated by the arrow X). The forward belt 12 has a lower run 28 which lies face-to-face with the upper run 26 of the belt 10. A characteristic of the forward belt 12 is that it is slack. More particularly, whereas its upper run is supported by the guide bars 24, its lower run, extending to an upper end reversing roller 18, rests slackly on the upper run of the rearward belt 10 and a slack loop 27 rests on the ground 17 in front of the lower roller 16 of the belt 10.

Figure 2:
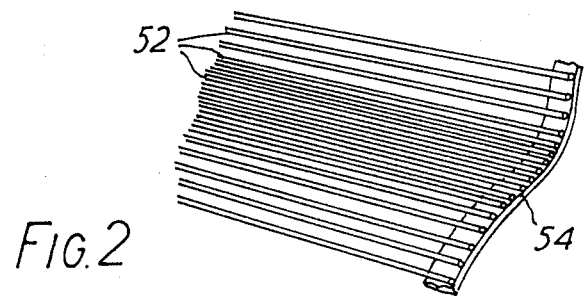
FIG. 2 shows a perspective view of a fragment of a conveyor belt suitable for the apparatus.

As shown in FIG. 2, the belts can conveniently be made from spaced steel rods 52 secured at their ends to flexible side members 54. This construction is particularly convenient as the spacing of the rods allows dirt, leaves, grass and other debris to fall through, and the rods can also engage sprockets, for example on the rollers 14,18, ensuring that the belts are driven at the correct speed. However, the belts could be of some other construction, e.g. solid rubber webbing.

Figure 3:
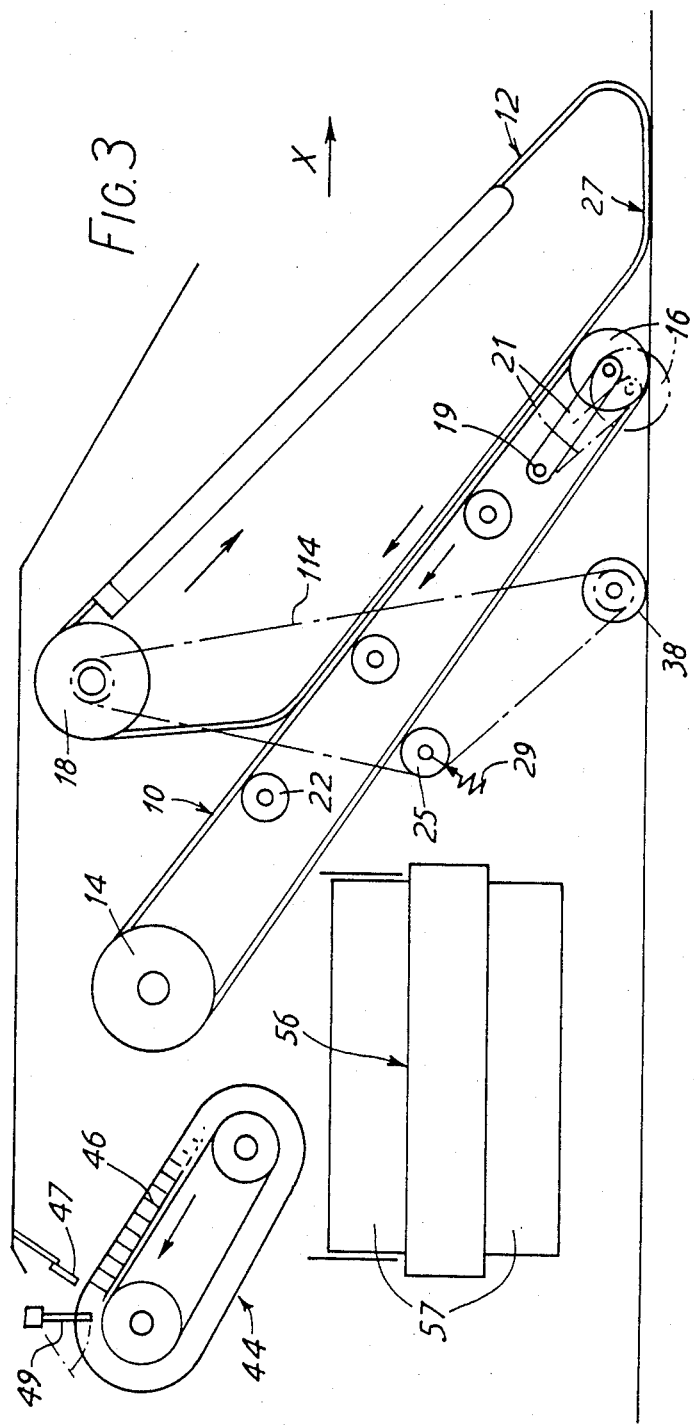
FIG. 3 shows a side view.

In FIGS. 3 to 5, the apparatus is mounted on a conventional agricultural tractor 100, comprising a chassis 102, front wheels 104 and rear wheels 106, and a conventional three-point mounting 108 and power take-off point 110 at the rear. (For clarity some of the detail has been omitted in the various Figures.) The harvesting machine frame is mounted on the tractor in suitable manner. The frame is not shown in any detail, but comprises a framework of appropriate shape to support the various components shown.

A motor drives the belts 10,12 suitably via the rollers 14, 18 (although it could be through other supporting rollers); also provides the drive for moving the machine forward, as indicated by the arrow X.

The power take-off from the tractor powers a hydraulic pump 112 which supplies a preset output power to a hydraulic motor (not shown) connected to ground wheels 38 on the frame of the harvesting machine. This ensures that there is enough power supplied to these wheels, and to the associated belts 10,12, so that they move at ground speed without tending to slew the machine around; but not too much power so that the friction between the ground wheels and the ground is overcome and the belts run too quickly.

In the embodiment shown in FIG. 3, the ground wheel 38 is suitably linked by a chain 114 to the upper end reversing roller 18 of the belt 12 and to a sprocket roller 25 biased by a spring 29 into engagement with the lower run of the belt 10. This ensures that the belts move at the correct speed in relation to each other and to the ground. More particularly, the belts may be driven at the same speed as the forward movement of the apparatus over the ground. Thus it will be seen that where the lower end portion 27 of the belt 12 rests slackly on the ground it is without any forward or rearward movement relative to the ground. The effect of this is that apples 50 or the like lying on the ground will be gently pinned by that portion 27 of the belt 12 before being drawn gently into the nip between the face-to-face region of the belts and conveyed to the upper end of that region. Because the forward belt 12 is slack, the apples are not compressed other than by the weight of the upper belt, which can be selected accordingly, but which in practice does not seem to be too critical. Moreover, because of the large slack loop of the lower run of the belt 12, a substantial depth of fruit can be accommodated between the belts, so that the machine is extremely efficient at clearing the ground of fruit.

Alternatively, the lower end portion 27 of the belt 12 may move in a rearward direction relative to the ground, causing the apples 50 to be moved towards the nip between the face-to-face region of the belts. It is desirable that any rearward movement is not too large, or damage to the apples 50 may result. It has been found that satisfactory results are obtained if the rearward speed of the lower end portion 22 relative to the ground is about 10% of the forward speed of the machine over the ground.

The lower end reversing roller 16 of the rear belt 10 is journalled at its ends to arms 21 which are pivoted at 19 to the frame of the machine so that the roller 16 can be displaced to follow undulations in the ground, as indicated by the full and phantom lines.

When the apples are discharged from the top of the belts 10,12, they fall a short distance onto a cleaning belt 44, which is provided over its surface with resilient radially projecting fingers 46, for example of rubber, so that it has the form of a coarse brush. The fingers are sufficiently long and resilient as to break the fall of the apples without bruising them, but not sufficient to support the apples and carry them around with the rotation of the belt. The belt is arranged to rotate in the direction as shown by the arrow, while the apples fall on the upwardly moving upper surface of the belt. Thus, the apples continue their downward fall, slowed by the belt and brushed by the fingers 46 which entrain dirt, leaves etc., and discharge this debris from the upper end of the belt, a resilient flap 47 blocking any apples, and a cleaning flap 49 removing the debris. The apples fall from the belt 44 onto a transverse conveyor 56 having flights 57 which entrain the apples. The conveyor lifts the apples up to discharge them onto a rearward conveyor 59 which extends over the top 61 of a trailer towed by the tractor and into which the apples are finally discharged.

In a modification of the embodiment of FIG. 3, the drive to the belt 10 may be positioned at the location of the sprocket roller 25, in a position such that the drive sprocket is pressed slightly into the belt 10 to ensure good engagement. This may be improved by having the upper part of the belt 10 (above the upper guide roller 22) inclined at a smaller angle to the ground relative to the rest of the belt 10. This also has the advantage of bringing the top of the belt 10 closer to the cleaning belt 44. Finally, the roller 16 may be fixed, rather than journalled to pivot at 19.

As shown in FIG. 5, the belt pick-up mechanism is mounted on the tractor by a series of pivoted link arms 63, so that the mechanism can be moved by hydraulic rams (not shown) into three positions. The first position A shown in full lines is the normal operative position. In the second position B the belts 10,12 and ground wheels 38 are lifted clear of the ground, but continue to operate, so that any fruit in the belts is cleared and discharged into the trailer. In the third position C the belts 10,12 are swung upwards so as to reduce the width of the machine for transport. In this condition the belts are not moving.

Referring to FIG. 6; this shows the basic two-belt arrangement of FIG. 1 with a modification provided by a scavenger roller 150 located just in front of the lower roller 16 of the lower belt 10, in the wedge-shaped gap between the roller and the ground. The scavenger roller rotates about a transverse axis, and is driven, preferably at a speed rather greater than that of the roller 16, in the direction indicated so as to flick the articles being harvested forwards and upwards into the nip between the belts. To aid this, the scavenger roller can be for example of square cross-section, or have peripheral bristles, or axially extending flexible vanes 152 (as shown). This modification is particularly appropriate for harvesting small articles such as nuts which would otherwise tend to wedge in the space between the roller 16 and the ground, being appreciably smaller than the smallest practicable radius for the roller 16.

Referring to FIG. 7, this shows an embodiment in which the slack loop 27 at the lower end of the forward belt is replaced by a roller 200 having a thick soft sponge surface 212, which is readily deflectable to accomodate the fruit or the like. The sponge can be of any suitable material such as rubber or plastics. The roller is driven about its axis 202 at ground speed or at a speed somewhat greater than ground speed, so as to have the same effect as the loop 27 of the belt 12. This embodiment is shown without any upper belt 12, but one could be provided if necessary, depending on the nature of the articles being picked up and the inclination of the lower belt 10.

Referring to FIG. 8, this shows a modification in which the slack loop 27 of the forward belt 12 is replaced by a roller brush 300 journalled to the frame about a transverse axis 302 so that the lowermost portion 304 contacts the ground, a rearward portion 306 lies adjacent the rearward belt 10, and an upper portion 308 contacts the lowermost region of the forward belt 12. The roller is driven in conjunction with the other belts at ground speed or at a speed somewhat greater than ground speed so that its lowermost portion 304 is stationary or moves rearwardly relative to the ground. The bristles 310 are long and flexible so that they deflect easily and to a substantial extent. In particular, the bristles deflect so that the lowermost portion 304 makes a substantial area of contact with the ground or with fruit or the like 50 lying on the ground. The embodiment of FIG. 8 could likewise omit the forward belt 12 in suitable cases. FIG. 9 shows an arrangement in which the lower roller 16 of the rearward belt 10 terminates short of the ground, the gap being filled by a brush roller 400 which co-operates with forward brush roller 300 to entrain the fruit 50 or the like. The brush roller 400 is driven in the same sense as the roller 16 of the belt 10, and the belt 10 is conveniently provided with flights 402 which enter the bristles of the roller 400 and extract the fruit 50 therefrom. In such a case, a forward belt 12 will generally be unnecessary.

In a further modification (not shown) the brush roller 300 of FIG. 9 is replaced by a forward belt 12, while retaining the rear brush 400 and rear belt 10, although it will probably be unnecessary to have flights on the belt 10 in that case. This is in one sense a further modification of the idea shown in FIG. 6.

FIG. 10 shows another embodiment of the invention, currently preferred. It is generally similar to the embodiment shown in FIG. 3, and the same reference numerals are used to indicate corresponding parts, where appropriate, and repeated explanation will not be given, except where necessary to understand the differences between the embodiments of FIGS. 3 and 10.

The main difference between the embodiments of FIGS. 3 and 10 concern the drive of belt 10. In FIG. 10 the drive is not via roller 14, but via a roller 501 which is positioned below the belt 10, and engages with it. The ground roller 38 controls the speed of the chain 114, and also the belt 10, as the chain 114 passes round roller 501. The chain 114 also passes round roller 18, hence controlling the speed of the belt 12. There is one further roller 502 supporting the chain 114, and this is connected to a hydraulic motor (not shown) which controls the torque on the chain 114. By adjustment of the position of roller 502, the chain tension may also be adjusted.

It can also be seen from FIG. 10 that the upper run of the belt 10 is not straight, but instead the upper part has a smaller angle of inclination relative to the ground (e.g. 20°) than the lower part (e.g. 38°).

The cleaning belt 44 is driven by a vee belt 503 extending between roller 18 and one of the rollers 504 of the cleaning belt 44. In this way the entire machine has a single drive system since the drive to chain 114 controls all three belts 10,12,44. Hence the drive system is simplified relative to other embodiments.

The machine may be driven so that the forward loop 27 of the belt 12 is stationary relative to the ground, or may move rearwardly (i.e. in the opposite direction to arrow X) if desired, as discussed above.

FIG. 10 also shows the support strips 505 for the transverse conveyor 56, which again has flights 57. The gap 506 between the roller 14 at the top of belt 10 and the roller 507 of the cleaning belt 44 is adjustable depending on the density of the articles being gathered, to ensure that an even distribution reaches the conveyor 56.

Various other modifications are possible; for example a pair of contra-rotating brushes may be provided at the forward corners of the pick-up frame to gather fruit from relatively inaccessible places and sweep them into the path of the gathering belts. Also, although the belts have been described as travelling at the same speed, it may be preferred to have them travelling at slightly different speeds so that a scrubbing action is imparted to the fruit to help clean it. This can be easily arranged by having slight differences in the diameters of the sprockets shown for example in FIG. 3.

Although the invention has been exemplified in relation to gathering fruit from the ground, it can be applied to gathering other articles, such as balls, from the ground or other surface.

I claim:

1. A machine for gathering articles from a surface, comprising:
    a chassis arranged for forward travel over the surface;
    article pick-up members each comprising forward and rearward endless belts journalled to the chassis about horizontal axes transverse to the direction of travel, said pick-up members defining a nip in which the articles can be entrained; and
    means for driving the pick-up members in counter-movement as the machine moves over the surface, said driving means including a drive roller for said forward belt engaging said forward belt at a part of said forward belt remote from the surface;
    wherein the forward belt has a slack lower run which rests on an upper run of the rearward belt, the forward belt has a lower end region which is flexible and freely deformable relative to the chassis, to define a slack loop which is free from contact with the driving means and the chassis, and has a part which rests on the surface in front of the rearward belt, and means for operatively connecting the driving means to the chassis to cause the part of the slack loop of the forward belt which rests on the surface to progress forwardly at a substantially non-positive speed relative to the surface.

2. A machine according to claim 1 wherein said belts are constructed from a series of transverse bars spaced apart and interconnected by flexible strips.

3. A machine according to claim 1 wherein the rearward pick-up member has a lower end reversing roller which is journalled at its ends to upwardly deflectable mountings, whereby the roller can follow undulations in the surface.

4. A machine according to claim 1 wherein a scavenger roller is provided adjacent the surface just in front of the rearward pick-up member, the scavenger member being mounted for rotation about a transverse axis and arranged to be driven at a speed greater than that of the rearward pick-up member but in the same direction, so as to flick small articles forwards and upwards into the nip between the forward and rearward pick-up members.

5. A machine according to claim 1 wherein the drive to the pick-up members is linked to the rotation of a ground-wheel which is given power assistance from a hydraulic motor/pump which delivers a predetermined maximum power so as to ensure that the ground-wheel rotates at ground speed without over-running and without applying undue resistance to the forward movement of the machine.

6. A machine according to claim 5 wherein the pick-up members and ground-wheel are arranged for mounting alongside a tractor means.

7. A machine according to claim 1 wherein the pick-up members are arranged for movement between an operative position in contact with the surface and a raised position in which they are above the surface but can continue to run so as to clear entrained articles.

* * * * *